July 9, 1946. H. GALLUSSER 2,403,715
ELECTRIC FURNACE PROCESS FOR PRODUCING MOLTEN IRON FROM IRON ORE
Filed July 30, 1943
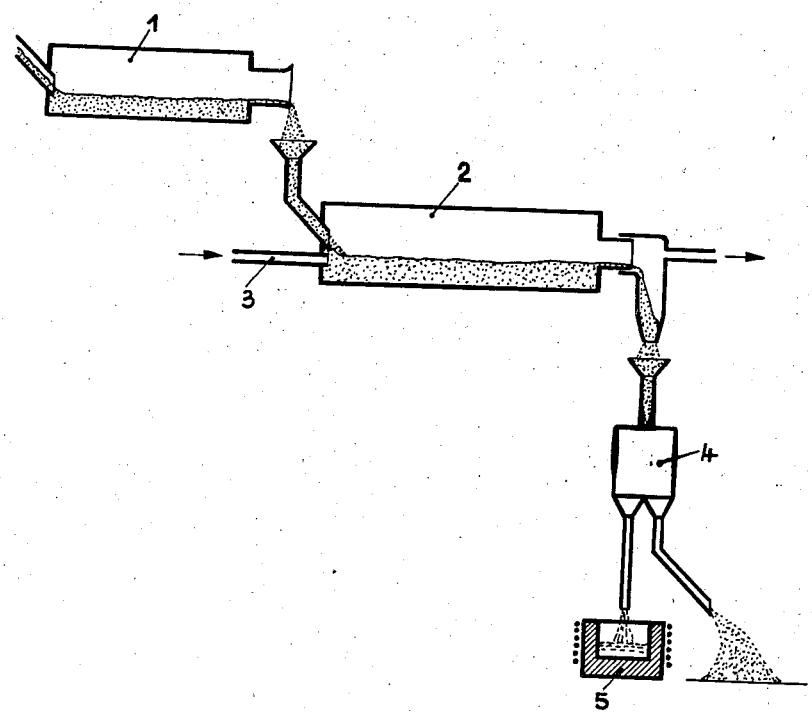
Inventor
Hans Gallusser
by Sommers + Young
Attorneys Patented July 9, 1946

2,403,715

UNITED STATES PATENT OFFICE 2,403,715

ELECTRIC FURNACE PROCESS FOR PRODUCING MOLTEN IRON FROM IRON ORE

Hans Gallusser, Geneva, Switzerland

Application July 30, 1943, Serial No. 496,796
In Switzerland February 5, 1942

1 Claim. (Cl. 75—11)

It is a well known fact that the amount of carbon present in iron diminishes its magnetizability and increases the hysteretic loss. Experiments have led to the finding that the first tenths per thousand in the carbon percentage are those which have the greatest bearing on magnetization and hysteretic losses. It was also found that once carbon is present in iron, it is extraordinarily difficult to eliminate the same as is, however, necessary for obtaining a highly magnetizable iron. Attempts have been made heretofore for overcoming these difficulties by first converting iron into ferric chloride and then decomposing the latter by electrolysis. However, the processes thus attempted proved to be very expensive, while the use of chlorine makes it difficult to carry them into satisfactory practice.

An object of the present invention is to provide a new or improved method of processing iron ore while avoiding the foregoing difficulties and while permitting entirely carbon-free and highly magnetizable iron to be obtained by directly deriving the same from iron ore which is known to be absolutely devoid of carbon impurities.

Another object of the invention is to provide a method of processing iron ore as aforesaid wherein the ore is carefully kept away throughout its treatment right to and inclusive of the fusion step from any contact with carbon or carbonaceous substances and therefore prevented from taking or absorbing any quantity thereof.

A further object of the invention is to provide a method of processing and converting iron ore for obtaining carbon-free iron as aforesaid under such conditions as to lessen the risk of the ore sintering into clinkered lumps while roasting the same under a reduced manometric pressure capable of promoting the evolution and escape of carbon dioxide.

With these and such other objects in view as will incidentally appear hereafter, the invention comprises the novel steps, sequence and combination of steps that will now be described in detail and specified in the appended claim.

In a practical embodiment of the method according to the invention as represented diagrammatically in the accompanying drawing, the iron ore is pugged and crushed to an approximate grit size of one millimeter and then roasted so as to eliminate therefrom moistness, combined or constitution water and carbon dioxide. In order to prevent any quantity of carbon from passing over into the iron during the roasting process, the latter should be so conducted as to preclude any access of carbon or carbon gases thereto. This can be conveniently achieved by resorting to electrical heating, for example in an induction furnace 1 (hereafter called the "primary furnace") of the type described in Patent No. 2,191,377.

For driving out carbon dioxide from the limy constituents or aggregates of the ore, a minimum temperature of 1000° C. is necessary under practical conditions when operating under atmospheric pressure. However this operational temperature may be reduced, provided the gases are sucked off under sub-atmospheric pressure by a vacuum pump, since the reduction of the outer pressure enables carbon dioxide to escape at a lower temperature. Furthermore, lowering the operational temperature has the advantage of precluding any risk of the ore sintering or clinkering up. This has an important bearing on the following reduction process.

After the ore has been roasted as above described, it is transferred to a similar furnace 2 (hereafter called the "secondary furnace") into which is admitted pure hydrogen by pipe 3. By electrically heating the roasted ore and the hydrogen to the most favorable temperature for chemical reduction, the iron oxide is converted to the state of pure iron devoid of any carbon admixture. This is due to the strict prevention of any access of carbon or carbon gases to the ore being processed as aforesaid. All non-ferrous constituents can be cast off by magnetic separation 4, and the iron concentrate can be finally fused in a high-frequency smelting furnace 5 (hereafter called the "tertiary furnace").

Iron obtained by the aforesaid sequence of steps is perfectly free from any carbon content and thus possesses the highest magnetic qualities in contradistinction with iron which has been manufactured as heretofore from carbon-bearing pig iron and which, as is well known, can never be totally purified of its carbon impurities.

What is claimed is:

A method of processing iron ore for obtaining carbon-free iron, comprising the steps of dividing substantially carbon-free iron ore to an approximate grit size of one millimeter, roasting the divided ore in a first electric furnace under conditions precluding the access of carbon and carbon gases and in an enclosure in which partial vacuum prevails to remove moisture and any carbon dioxide present, transferring the roasted ore to a second closed electric furnace into which is admitted pure hydrogen, heating the roasted ore and hydrogen in said second furnace to such a temperature as will chemically reduce the ore to metallic iron, and fusing the resultant iron mass in a third electric smelting furnace.

HANS GALLUSSER.